(12) United States Patent
Ren et al.

(10) Patent No.: US 12,289,712 B2
(45) Date of Patent: Apr. 29, 2025

(54) INFORMATION SENDING METHOD AND APPARATUS

(71) Applicant: ZTE CORPORATION, Guangdong (CN)

(72) Inventors: Min Ren, Guangdong (CN); Xianghui Han, Guangdong (CN); Yiwei Deng, Guangdong (CN); Peng Hao, Guangdong (CN); Wei Gou, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 673 days.

(21) Appl. No.: 17/598,376

(22) PCT Filed: Feb. 20, 2020

(86) PCT No.: PCT/CN2020/075953
§ 371 (c)(1),
(2) Date: Sep. 27, 2021

(87) PCT Pub. No.: WO2020/199779
PCT Pub. Date: Oct. 8, 2020

(65) Prior Publication Data
US 2022/0191846 A1  Jun. 16, 2022

(30) Foreign Application Priority Data
Mar. 29, 2019  (CN) .......................... 201910253316.4

(51) Int. Cl.
*H04W 72/044*  (2023.01)
*H04L 5/00*  (2006.01)

(52) U.S. Cl.
CPC ......... *H04W 72/044* (2013.01); *H04L 5/0048* (2013.01)

(58) Field of Classification Search
CPC ........... H04W 72/044; H04W 72/0446; H04W 72/23; H04L 5/0048; H04L 5/0051;
(Continued)

(56) References Cited

U.S. PATENT DOCUMENTS

2016/0157254 A1   6/2016  Novlan et al.
2020/0100223 A1*  3/2020  Park .................. H04W 72/0446
(Continued)

FOREIGN PATENT DOCUMENTS

CN     104039013 A     9/2014
CN     108809543 A    11/2018
(Continued)

OTHER PUBLICATIONS

Mediatek R1-1900210 Enhancements of NR PUSCH for URLLC Jan. 2019 (Year: 2019).*
(Continued)

*Primary Examiner* — Rina C Pancholi
(74) *Attorney, Agent, or Firm* — Li & Cai Intellectual Property (USA) Office

(57) ABSTRACT

An information sending method and an information sending apparatus are disclosed. The method includes receiving configuration information configured to indicate that a same transport block is provided with Q transmission opportunities in R consecutive slots, and sending the transport block according to the configuration information. The problem of how to send a transport block using a transmission opportunity in the related art can be solved.

17 Claims, 7 Drawing Sheets

Receive configuration information configured to indicate that a same TB is provided with Q transmission opportunities in R consecutive slots — S202 send the TB according to the configuration information — S204

(58) Field of Classification Search
CPC ....... H04L 1/08; H04L 1/1887; H04L 1/1893; H04L 5/0094
See application file for complete search history.

(56) References Cited

U.S. PATENT DOCUMENTS

2022/0014333 A1* 1/2022 Bhamri ................ H04W 80/02
2022/0103294 A1* 3/2022 Ying .................... H04W 72/23

FOREIGN PATENT DOCUMENTS

CN    111436144 A    7/2020
CN    111885731 A    11/2020

OTHER PUBLICATIONS

Huawei R1-1901559 Pusch enhancements for URLLC Mar. 2019 (Year: 2019).*
WIPO, International Search Report issued on Apr. 20, 2020.
Huawei, HiSilicon. "Enhanced UL configured grant transmissions," 3GPP TSG RAN WG1, Chengdu, China, Sep. 29, 2018.
European Patent Office, the extended European Search Report dated Nov. 7, 2022, for corresponding EP application No. 20785246.8.
Mediatek Inc, "Enhancements of NR pusch for URLLC", 3GPP Draft, Jan. 12, 2019.
Huawei, et al., "PUSCH enhancements for URLLC", 3GPP Draft, Feb. 16, 2019.
China Patent Office, the second Office action dated Aug. 31, 2024, for corresponding CN application No. 201910253316.4.
NTT Docomo, Inc., "Physical Layer Enhancements for NR URLLC", R1-1809163, 3GPP TSG RAN WG1 Meeting #94 Gothenburg, Sweden, Aug. 20-24, 2018.

* cited by examiner

INFORMATION SENDING METHOD AND APPARATUS

The present disclosure claims the priority to the Chinese Patent Application No. 201910253316.4 filed with the CNIPA on Mar. 29, 2019, the entire contents of which are incorporated herein by reference.

TECHNICAL FIELD

The present disclosure relates to the field of communications, and in particular, to an information sending method and an information sending apparatus.

BACKGROUND

At present, the standard-setting work at the first stage of the 5th Generation mobile communication technology (5G) has completed. Considering the trends of standard setting and technical development, 5G systems are dedicated to study technical indices such as higher rate (Gbps), massive link (1M/Km2), ultra-low latency (1 ms), higher reliability and 100-times energy efficiency improvement for supporting new demand changes.

Slot-based aggregation based on dynamic scheduling and scheduling-free slot-based repetition are introduced at the first stage of 5G for ensuring coverage, which refers to that a terminal sends a Transport Block (TB) repeatedly using multiple slots and the TB is allocated the same time domain resource in each slot. A slot length of an existing aggregatable or repeatable slot is 1/2/4/8. At the second stage of 5G, in order to support the characteristics of transmission with ultra-high reliability and ultra-low latency to achieve transmitting high-reliable and low-latency services within relatively short transmission time, uplink aggregated transmission based on dynamic scheduling and scheduling-free uplink repeated transmission need to be enhanced, therefore, mini-slot based repetition is introduced for transmission of TBs.

No solution has been proposed to the problem of how to send a TB using a transmission opportunity in the related art.

SUMMARY

Embodiments of the present disclosure provide an information sending method and an information sending apparatus, so as to solve at least the problem of how to send a TB using a transmission opportunity in the related art.

According to an embodiment of the present disclosure, there is provided an information sending method, including:

receiving configuration information configured to indicate that a same TB is provided with Q transmission opportunities in R consecutive slots, with Q being an integer greater than or equal to 1, R being an integer and 0<R≤Q; and sending the TB according to the configuration information.

According to another embodiment of the present disclosure, there is provided an information sending apparatus, including:

a receiving module configured to receive configuration information configured to indicate that a same TB is provided with Q transmission opportunities in R consecutive slots, with Q being an integer greater than or equal to 1, R being an integer and 0<R≤Q; and a sending module configured to send the TB according to the configuration information.

According to yet another embodiment of the present disclosure, there is provided a storage medium having a computer program stored therein, the computer program is configured to perform steps in the method above when being run.

According to still another embodiment of the present disclosure, there is provided an electronic device, including a memory having a computer program stored therein, and a processor configured to run the computer program to perform steps in the method above.

By receiving the configuration information configured to indicate that a same TB is provided with Q transmission opportunities in R consecutive slots and sending the TB according to the configuration information, the present disclosure can solve the problem of how to send a TB using an transmission opportunity in the related art.

BRIEF DESCRIPTION OF THE DRAWINGS

The drawings described here are intended to provide a furthermore understanding of the present disclosure and constitute a part of the present disclosure. The exemplary embodiments of the present disclosure and the description thereof are intended to explain the present disclosure, but do not constitute improper limitation to the present disclosure. In the drawings:

FIG. 3 is a schematic diagram of transmission opportunity #t according to an embodiment of the present disclosure;

FIG. 4 is a schematic diagram illustrating transmission of a TB according to an embodiment of the present disclosure;

FIG. 5 is a schematic diagram illustrating transmission of a TB according to an embodiment of the present disclosure;

DETAILED DESCRIPTION

The present disclosure will be described in detail below with reference to the drawings and embodiments. It should be noted that the embodiments of the present disclosure and the features therein may be combined with each other if no conflict is incurred.

It should be noted that the terms "first", "second" and the like in description, claims, and drawings of the present disclosure are used for distinguishing between similar objects, but not necessarily for describing a particular order or chronological order.

Figure 1:
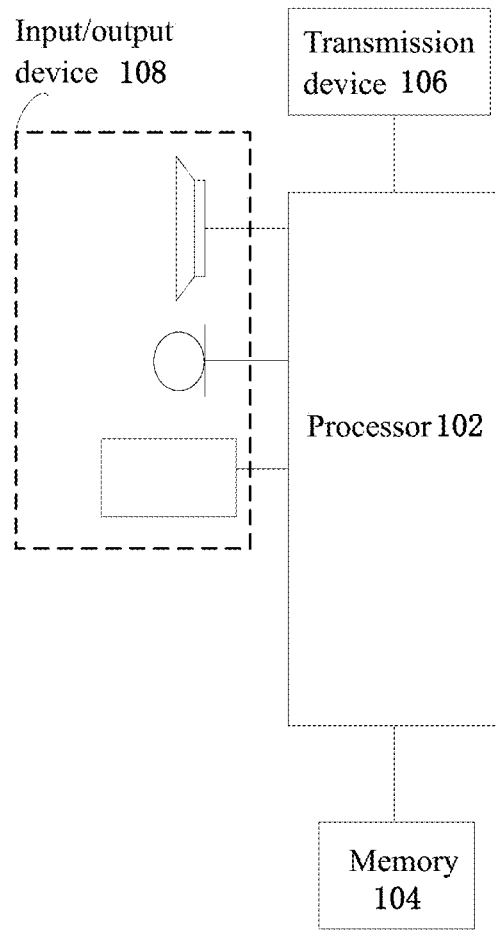
FIG. 1 is a block diagram illustrating a hardware structure of a mobile terminal to which an information sending method is applied according to an embodiment of the present disclosure.

A method provided by an embodiment of the present disclosure may be performed in a mobile terminal, a computer terminal or a similar computing device. Taking performing the method in a mobile terminal as an example, FIG. 1 is a block diagram illustrating a hardware structure of a mobile terminal in which an information sending method is performed according to an embodiment of the present disclosure. As shown in FIG. 1, a mobile terminal 10 may include one or more processors 102 (only one processor is shown in FIG. 1), which may include, but is not limited to, a processing device such as a microprocessor (e.g. a microcontroller unit (MCU)) or a programmable logic device (e.g. a field programmable gate array (FPGA)), and a memory 104 for storing data. In some implementations, the mobile terminal may further include a transmission device 106 for communication functions and an input/output device 108. It should be understood by those of ordinary skill in the art that the structure shown in FIG. 1 is only for illustration and is not intended to limit the structure of the mobile terminal. For example, the mobile terminal 10 may include more or fewer components than those shown in FIG. 1, or may be configured in a way different from that shown in FIG. 1.

The memory 104 may be configured to store a computer program, such as a software program and a module of application software, e.g. a computer program corresponding to the information sending method of the present disclosure. By running the computer program stored in the memory 104, the processor 102 executes various functional applications and data processing to implement the above method. The memory 104 may include a high-speed random access memory, and may also include a non-volatile memory, such as one or more magnetic storage devices, flash memories, or other non-volatile solid-state memories. In some examples, the memory 104 may further include a memory remotely arranged relative to the processor 102, and the remote memory may be connected to the mobile terminal 10 via a network. Examples of the network include, but are not limited to, the Internet, an intranet, a local area network, a mobile communication network, and the combinations thereof.

The transmission device 106 is configured to receive or transmit data via a network. Specific examples of the network may include a wireless network provided by a communication provider of the mobile terminal 10. In an example, the transmission device 106 includes a Network Interface Controller (NIC), which may be connected to other network devices via a base station so as to communicate with the Internet. In another example, the transmission device 106 may be a Radio Frequency (RF) module, which is configured to communicate with the Internet in a wireless manner.

Figure 2:
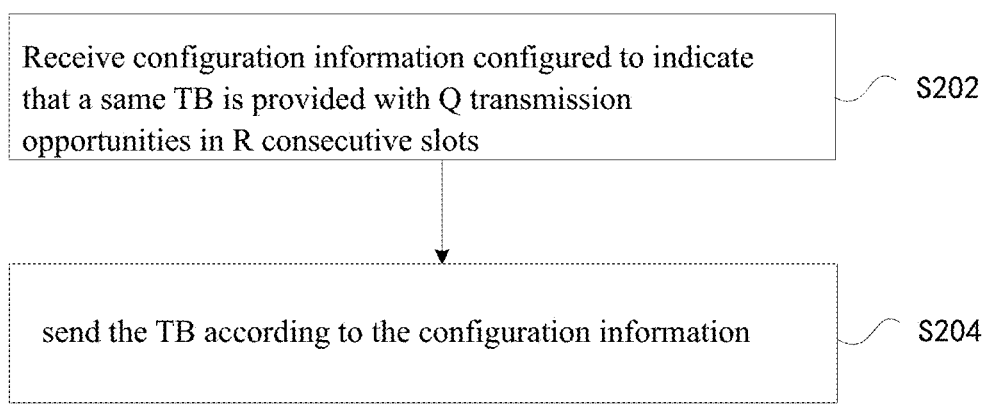
FIG. 2 is a flowchart illustrating an information sending method according to an embodiment of the present disclosure.

An embodiment of the present disclosure provides an information sending method applied to the above mobile terminal. FIG. 2 is a flowchart illustrating an information sending method according to an embodiment of the present disclosure. As shown in FIG. 2, the method includes the following steps:

step S202, receiving configuration information configured to indicate that a same TB is provided with Q transmission opportunities in R consecutive slots, with Q being an integer greater than or equal to 1, R being an integer and $0 < R \leq Q$; and step S204, sending the TB according to the configuration information.

Through the above steps S202 and S204, the configuration information configured to indicate that a same TB is provided with Q transmission opportunities in R consecutive slots is received, and the TB is sent according to the configuration information, so that the problem of how to send a TB using a transmission opportunity in the related art can be solved.

In some implementations, the configuration information includes at least one of:

no information is sent at transmission opportunity #t; and demodulation reference information (i.e., a demodulation reference signal (DMRS)) is sent at the transmission opportunity #t;

in a same slot, the transmission opportunity #t and a time domain resource of a consecutive transmission opportunity relative to the transmission opportunity #t in terms of time domain are combined into a new transmission opportunity;

in a same slot, in response to that a position of time domain resource of the transmission opportunity #t and positions of time domain resources of other transmission opportunities are not consecutive in terms of time domain, no DMRS or information is sent at the transmission opportunity #t;

where t is an index of transmission opportunity and is an integer, and $0 < t \leq Q$.

In some implementations, the configuration information that the DMRS is sent at the transmission opportunity #t includes:

the DMRS is sent on all time domain symbols corresponding to the transmission opportunity #t; or, the DMRS is sent on one time domain symbol corresponding to the transmission opportunity #t.

In some implementations, the configuration information may further include:

in response to that frequency hopping across different transmission opportunities is enabled, no frequency hopping is carried out at the transmission opportunity #t.

In some implementations, a frequency domain position of the transmission opportunity #t is the same as a frequency domain position of a second hop of a previous transmission opportunity/a first hop of a following transmission opportunity, with the previous transmission opportunity/following transmission opportunity and the transmission opportunity #t being consecutive in terms of time domain.

In some implementations, the configuration information may further include:

the transmission opportunity #t is determined in one of following ways:

in response to that a time domain resource of a transmission opportunity is less than a predefined value N, the transmission opportunity is the transmission opportunity #t; and N is an integer greater than or equal to 1;

in response to that a time domain resource of a transmission opportunity is less than M=f(L), the transmission opportunity is the transmission opportunity #t, and L is a time domain resource length of one of nominal transmission opportunities, or a time domain resource length of a first actual transmission opportunity, or a total time domain resource length of all actual transmission opportunities, or a shortest time domain resource length among those of the actual transmission opportunities, or a time domain resource length of a nominal or actual transmission opportunity corresponding to any one of Redundancy Version RV={0, 1,2,3}, or a longest time domain resource length among those of the actual transmission opportunities; and in response to that a target bitrate of a transmission opportunity is greater than a predefined target bitrate, the transmission opportunity is the transmission opportunity #t.

In some implementations, $$f(L) = \left\lfloor \frac{L}{X} \right\rfloor \text{ or } f(L) = \left\lceil \frac{L}{X} \right\rceil,$$

where L and X are integers greater than or equal to 1.

The predefined target bitrate is notified by Radio Resource Control (RRC) or Downlink Control Information (DCI), or acquired from target bitrates in a Modulation and Coding Scheme (MC S) index.

In some implementations, the configuration information includes:

an indication of time domain resource information of the Q transmission opportunities; and an indication of a transmission scheme of the Q transmission opportunities.

In some implementations, the transmission scheme may be any of the following transmission schemes:

Transmission Scheme 1: Q transmission opportunities are allocated in a same slot, or in a segment of uplink information transmission resource in a same slot, or in R consecutive slots;

Transmission Scheme 2: only one transmission opportunity is allocated in a segment of uplink information transmission resource in a same slot.

In some implementations, the time domain resource information includes at least one of the following information combinations:

Information Combination I: a starting symbol Si of an $i^{th}$ transmission opportunity, a time domain duration Li of the $i^{th}$ transmission opportunity and a slot index of a slot where the $i^{th}$ transmission opportunity is located; or, the starting symbol Si of the $i^{th}$ transmission opportunity, the time domain duration Li of the $i^{th}$ transmission opportunity and a slot index of a second transmission opportunity;

Information Combination II: a start and length indicator SLIVi of the $i^{th}$ transmission opportunity and the slot index of the slot where the $i^{th}$ transmission opportunity is located; or, the start and length indicator SLIVi of the $i^{th}$ transmission opportunity and the slot index of the second transmission opportunity;

Information Combination III: the starting symbol Si of the $i^{th}$ transmission opportunity, the time domain duration Li of the $i^{th}$ transmission opportunity and a cross-slot indicator which is related to the number of transmission opportunities or the number of repetitions;

Information Combination IV: the start and length indicator SLIVi of the $i^{th}$ transmission opportunity and the cross-slot indicator;

Information Combination V: the starting symbol Si of the $i^{th}$ transmission opportunity and the time domain duration Li of the $i^{th}$ transmission opportunity;

Information Combination VI: the start and length indicator SLIVi of the $i^{th}$ transmission opportunity;

where i is an integer and $0<i\leq Q$.

In some implementations, the SLIVi is configured for obtaining the starting symbol Si in time domain and the time domain duration Li of the $i^{th}$ transmission opportunity.

In some implementations, the time domain resource information is configured by an upper layer.

In some implementations, the time domain resource information is jointly indicated through configuration by the upper layer and RRC signaling; or the time domain resource information is jointly indicated through configuration by the upper layer and DCI signaling.

In some implementations, a slot index of a first transmission opportunity is determined by a slot offset, which refers to a duration from downlink transmission of DCI to uplink transmission of Physical Uplink Shared Channel (PUSCH).

In some implementations, the cross-slot indicator is a bitmap indicator, and indicates whether a current transmission opportunity crosses over a slot boundary through bit flipping, and the first bit in a cross-slot indicator field represents slot index information of the second transmission opportunity.

In the embodiment of the present disclosure, the configuration information may be obtained through RRC signaling or DCI.

In the embodiment of the present disclosure, the terminal receives the configuration information, and sends a same PUSCH/TB repeatedly at one or more transmission opportunities in a same slot or at one or more transmission opportunities in multiple consecutive available slots according to the configuration information. The PUSCH or TB refers to the information carried on a physical uplink shared channel. The configuration information is obtained by any one of the following means: RRC signaling and DCI signaling. The embodiment of the present disclosure is illustrated in detail below by specific examples.

In addition, uplink transmission is just taken as an example in the description of the embodiment of the present disclosure. It should be understood that the technical solutions can also be applied to downlink transmission, or other physical layer channels of 4G or 5G, such as a control channel, a random access channel and a data channel.

EXAMPLE ONE

Figures 3, 4, 5:
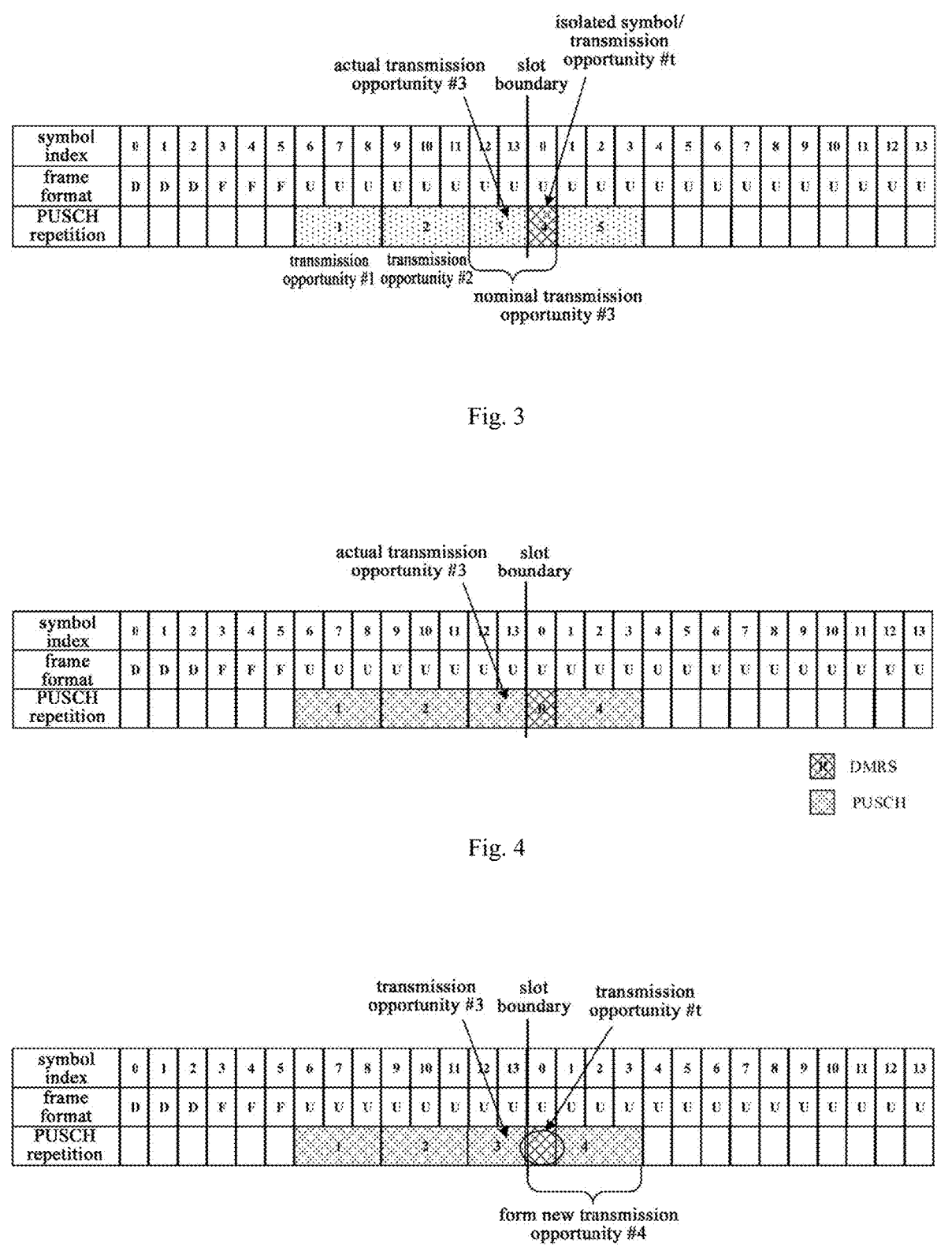

In this example, the transmission opportunity #t is determined in one of the following ways, and #t is the index of the transmission opportunity and an integer, and $0<t\leq Q$. Actual repetition #4 in FIG. 3 is the transmission opportunity #t. A time domain symbol where the transmission opportunity #t is located is defined as an "isolated" symbol in this example.

Way 1: if a time domain symbol of a transmission opportunity is less than a predefined value N, the transmission opportunity is the transmission opportunity #t, and the time domain symbol of the transmission opportunity #t is an "isolated" symbol.

In some implementations, N is an integer greater than or equal to 1, for example, N=2.

In some implementations, a value of N varies according to different uplink waveforms. In a case of an uplink waveform of Cyclic-Prefix Orthogonal Frequency Division Multiplexing (CP-OFDM), N is equal to 2; and in a case of an uplink waveform of Single-Carrier Frequency-Division Multiple Access (SC-FDMA), N is equal to 3.

In some implementations, the predefined value N may be notified by RRC signaling or DCI signaling.

FIG. 3 is a schematic diagram of the transmission opportunity #t according to an embodiment of the present disclosure. As shown in FIG. 3, a nominal transmission opportunity #3 (nominal repetition #3) is divided into an actual transmission opportunity #3 and an actual transmission opportunity #4 (actual repetition #3 and actual repetition #4) across a slot boundary, and the time domain symbol of the actual transmission opportunity #4 is less than 2, therefore, the actual transmission opportunity #4 is the transmission opportunity #t and the time domain symbol where the transmission opportunity #t is located is an "isolated" symbol.

Way 2: if a time domain symbol of a transmission opportunity is less than M=f(L), the transmission opportunity is the transmission opportunity #t, and a time domain symbol where the transmission opportunity #t is located is an "isolated" symbol.

In some implementations, L is a time domain symbol length of one of nominal transmission opportunities; or L is a time domain symbol length of a first actual transmission opportunity; or L is a total time domain symbol length of all actual transmission opportunities; or L is a shortest time domain symbol length among those of the actual transmission opportunities; or L is a time domain symbol length of a nominal or actual transmission opportunity corresponding to any one of RV={0,1,2,3}; or L is a longest time domain symbol length among those of the actual transmission opportunities.

In some implementations, $$f(L) = \left\lfloor \frac{L}{X} \right\rfloor \text{ or } f(L) = \left\lceil \frac{L}{X} \right\rceil,$$

where X is an integer greater than or equal to 1, for example, X=2.

FIG. 3 is a schematic diagram of the transmission opportunity #t according to an embodiment of the present disclosure. As shown in FIG. 3, L=3, that is, L is the time domain symbol length of the first actual transmission opportunity.

$$X = 2, f(L) = \left\lceil \frac{L}{X} \right\rceil = \left\lceil \frac{3}{2} \right\rceil = 2$$

and a time domain symbol length of the actual transmission opportunity #4 is one symbol and is less than f(L)=2, so the actual transmission opportunity #4 is the transmission opportunity #t and a time domain symbol of the actual transmission opportunity #4 is an "isolated" symbol.

Way 3: if a target bitrate of a transport block size (TBS) carried at a transmission opportunity is greater than a predefined target bitrate, the transmission opportunity is the transmission opportunity #t, and a time domain symbol of the transmission opportunity #t is an "isolated" symbol.

In some implementations, the predefined target bitrate is notified by RRC or DCI, or acquired from target bitrates in an MCS index.

As shown in FIG. 3, the TBS is determined by the time domain symbol length of the first transmission opportunity, the predefined target bitrate is ⅓, and a target bitrate determined by the time domain symbol length of the actual transmission opportunity #4 is ½, therefore, the time domain symbol of the actual transmission opportunity #4 is an "isolated" symbol.

It is also possible that the predefined target bitrate is Y which may be any number from 0 to 1, including a decimal. For example, in a case of Y=0.98, if a bitrate corresponding to a TBS determined by a nominal or actual transmission opportunity is greater than 0.98, a time domain symbol corresponding to the transmission opportunity is an "isolated" symbol.

EXAMPLE TWO

When a transmission opportunity generated in the Example One is the transmission opportunity #t and the time domain symbol of the transmission opportunity #t is an "isolated" symbol, the behavior of the terminal may be in any one of the following modes.

Mode 1: the terminal does not send any information at the transmission opportunity #t, and the information includes service data, control data, random access information, a DMRS or the like.

In some implementations, in a same slot, if a position of time domain symbol corresponding to the transmission opportunity #t and positions of time domain symbols corresponding to other transmission opportunities are not consecutive in terms of time domain, the terminal does not send any information at the transmission opportunity #t, and the information includes service data, control data, random access information, a DMRS or the like.

In some implementations, the transmission opportunity #t is not included in a total number of repetitions or a repetition index. That is, the transmission opportunity #t is skipped, and a transmission opportunity index supposed to be given to the transmission opportunity #t is sequentially given to a next available transmission opportunity.

Mode 2: the terminal sends a DMRS at the transmission opportunity #t, and FIG. 4 is a schematic diagram illustrating transmission of a TB according to an embodiment of the present disclosure.

In some implementations, the terminal sends the DMRS on all time domain symbols corresponding to the transmission opportunity #t; or the DMRS sends the DMRS on one time domain symbol corresponding to the terminal transmission opportunity #t.

Mode 3: FIG. 5 is a schematic diagram illustrating transmission of a TB according to an embodiment of the present disclosure. As shown in FIG. 5, in a same slot, if positions of time domain symbols of the transmission opportunity #t and another transmission opportunity are consecutive in terms of time domain, the transmission opportunity #t and the another transmission opportunity form a new transmission opportunity, and the terminal sends PUSCH on the time domain symbols corresponding to the new transmission opportunity.

In addition, if the conditions set in the ways proposed in the Example One are not satisfied, there is no transmission opportunity #t, in which case the terminal sends the PUSCH, the DMRS or service data/control data at a non-transmission opportunity #t, such as the actual transmission opportunity #3 shown in FIG. 3, that is, the actual transmission opportunity #3 is not the transmission opportunity #t.

EXAMPLE THREE

Figure 6:
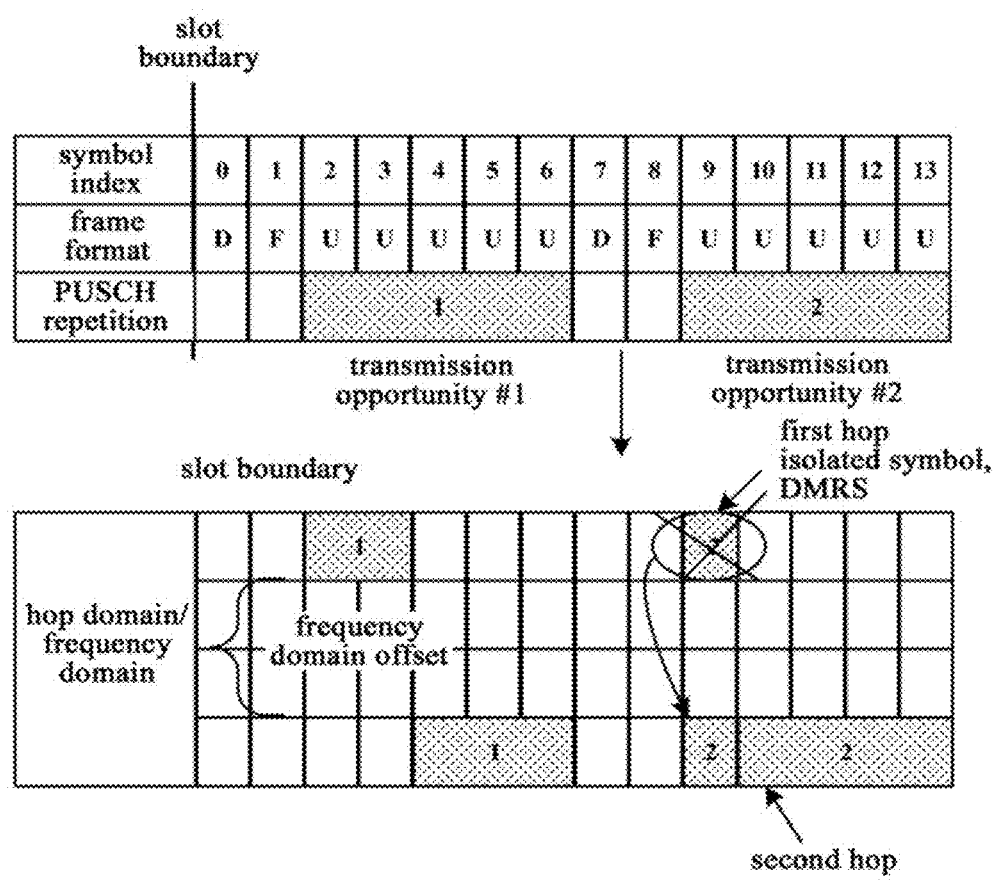
FIG. 6 is a schematic diagram illustrating transmission of a TB according to an embodiment of the present disclosure.

FIG. 6 is a schematic diagram illustrating transmission of a TB according to an embodiment of the present disclosure. As shown in FIG. 6, in a case where a base station enables an intra-repetition frequency hopping function, that is, frequency hopping is carried out within a transmission opportunity, if a time domain symbol of a first hop or a second hop of a transmission opportunity is less than a predefined Z or Z=f(L) after intra-repetition frequency hopping is completed in the transmission opportunity, no intra-repetition frequency hopping is carried out in the transmission opportunity. That is, the transmission opportunities may differ in whether frequency hopping is enabled or in frequency hopping pattern.

In some implementations, in the case where the base station enables the intra-repetition frequency hopping function, when a time domain symbol of a first hop or a second hop of a transmission opportunity is an isolated symbol after the intra-repetition frequency hopping is enabled in the transmission opportunity and a DMRS is sent on the isolated symbol, a frequency domain position of the first hop or the second hop of the transmission opportunity is the same as that of a previous or following transmission opportunity, with the previous or following transmission opportunity and the transmission opportunity being consecutive in terms of time domain. As shown in FIG. 6, after the intra-repetition frequency hopping is enabled at a transmission opportunity #2, a first hop has one time domain symbol, a second hop has five time domain symbols, a DMRS is carried on the first hop and the time domain symbol of the first hop is an isolated symbol, then a frequency domain position of the first hop of the transmission opportunity #2 is the same as that of a second hop of a transmission opportunity #1.

In some implementations, an additional DMRS is enabled when a time domain duration of a transmission opportunity corresponding to a nominal repetition is fourteen symbols, it is assumed that there are 3 DMRSs in total, and the transmission opportunity #1 of PUSCH is divided into a first hop having six symbols and a second hop having eight symbols after the intra-repetition frequency hopping is enabled. According to the Release 15 in which it is defined that a PUSCH is equal to eight symbols, there are 3 DMRSs, and a total number of DMRSs sent in the two hops is greater than the number of DMRSs sent through PUSCH transmission at the nominal repetition, which causes low spectral efficiency. Therefore, when PUSCH transmission at a nominal repetition is divided into a first hop and a second hop, and a total number of DMRSs sent in the first and second hops is greater than the number of DMRSs sent through the PUSCH transmission at the nominal repetition, no additional DMRS is set through upper layer signaling or DCI.

Figure 7:
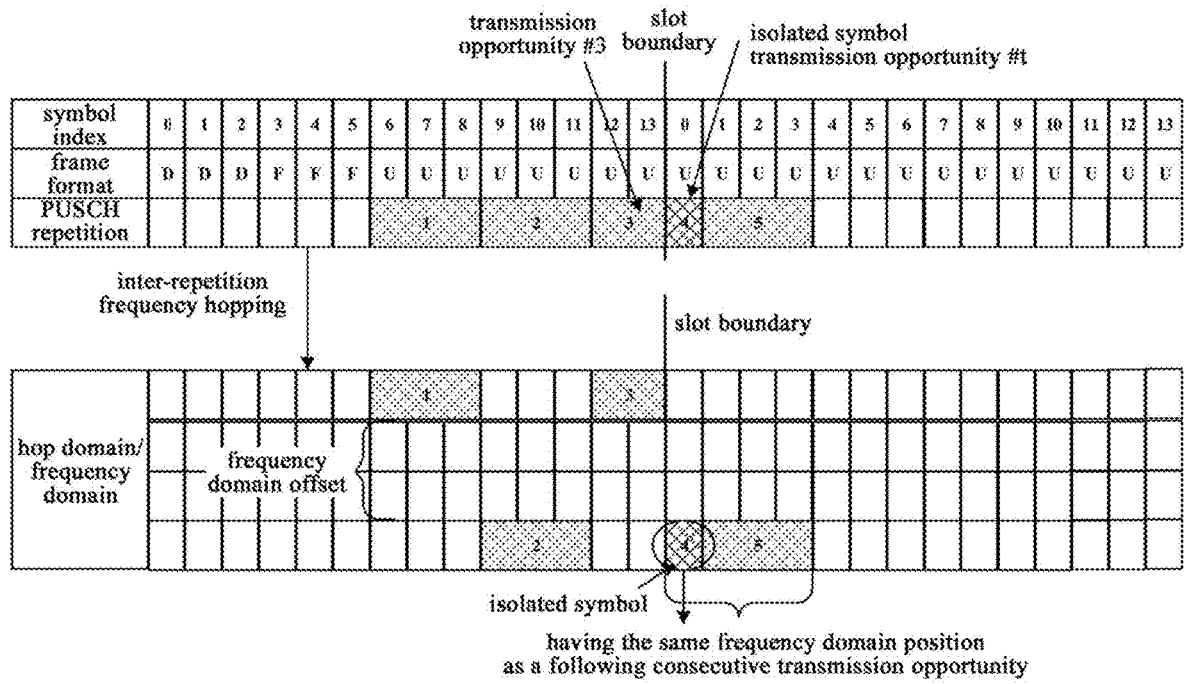
FIG. 7 is a schematic diagram illustrating transmission of a TB according to an embodiment of the present disclosure.

FIG. 7 is a schematic diagram illustrating transmission of a TB according to an embodiment of the present disclosure. As shown in FIG. 7, in a case where a base station enables an inter-repetition frequency hopping function, that is, frequency hopping is carried out across different transmission opportunities, if a time domain resource of a transmission opportunity is less than a predefined Z or Z=f(L) after inter-repetition frequency hopping is carried out at the transmission opportunity, no inter-repetition frequency hopping is carried out at the transmission opportunity. In some implementations, a frequency domain position of the transmission opportunity is the same as that of a transmission opportunity coming before or after the transmission opportunity in terms of time domain. Or, the frequency domain position of the transmission opportunity is the same as that of another transmission opportunity which is consecutive relative to the transmission opportunity in terms of time domain. As shown in FIG. 7, the transmission opportunity #4 is the transmission opportunity #t, and a frequency domain position of the transmission opportunity #4 is the same as that of transmission opportunity #5.

Z is an integer greater than or equal to 1, for example, Z=2.

In some implementations, a value of Z varies according to different uplink waveforms. In a case of an uplink waveform of CP-OFDM, Z is equal to 2; and in a case of an uplink waveform of SC-FDMA, Z is equal to 3.

In some implementations, the predefined value Z may be notified by RRC signaling or DCI signaling.

$$f(L) = \left\lfloor \frac{L}{X} \right\rfloor \text{ or } f(L) = \left\lceil \frac{L}{X} \right\rceil,$$

where X is an integer greater than or equal to 1, for example, X=2. L is a time domain symbol length of one of nominal transmission opportunities; or L is a time domain symbol length of a first actual transmission opportunity; or L is a total time domain symbol length of all actual transmission opportunities; or L is a shortest time domain symbol length among those of the actual transmission opportunities; or L is a time domain symbol length of a nominal or actual transmission opportunity corresponding to any one of RV={0,1,2,3}; or L is a longest time domain symbol length among those of the actual transmission opportunities.

EXAMPLE FOUR

For type 1 (a PUSCH transmission type scheduled by RRC signaling) or type 2 (a PUSCH transmission type scheduled by activated DCI) of scheduling-free transmission, the behavior of the terminal may be in any of the following modes when a transmission opportunity collides with a subframe format in a set of resources, the transmission opportunity colliding with the subframe format means that all or part of time domain symbols corresponding to the transmission opportunity are downlink or flexible symbols.

Figure 8:
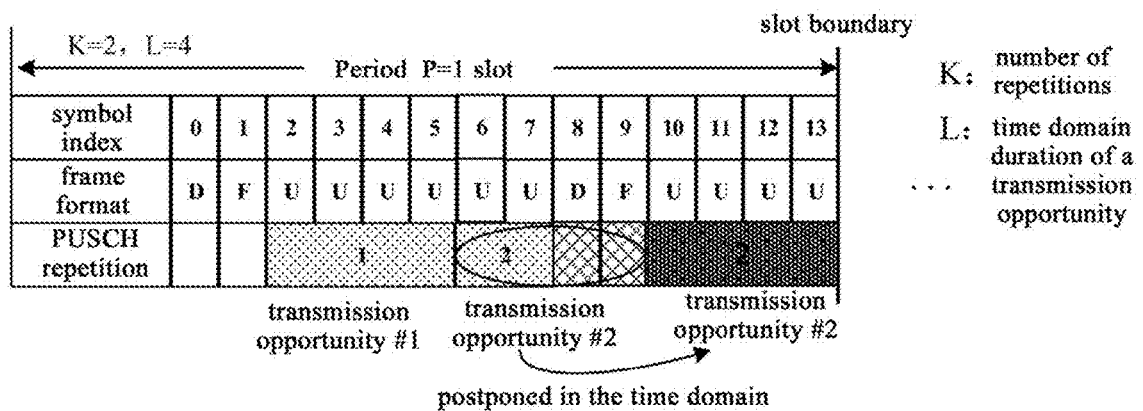
FIG. 8 is a schematic diagram illustrating transmission of a TB according to an embodiment of the present disclosure.

Mode 1: the terminal postpones the colliding transmission opportunity in the time domain without crossing a period P; but if the postpone of the colliding transmission opportunity in the time domain will cross the period P, the terminal does not postpone the colliding transmission opportunity in the time domain. FIG. 8 is a schematic diagram illustrating transmission of a TB according to an embodiment of the present disclosure. As shown in FIG. 8, when a symbol #8 and a symbol #9 where the transmission opportunity #2 is located collide with subframe formats, that is, when a transmission direction of a subframe format in uplink transmission is D or F, the terminal postpones the transmission opportunity #2 to a symbol #10 to a symbol #13 for transmission, without crossing the period P. No information is sent on symbol #6 to symbol #9.

Figure 9:
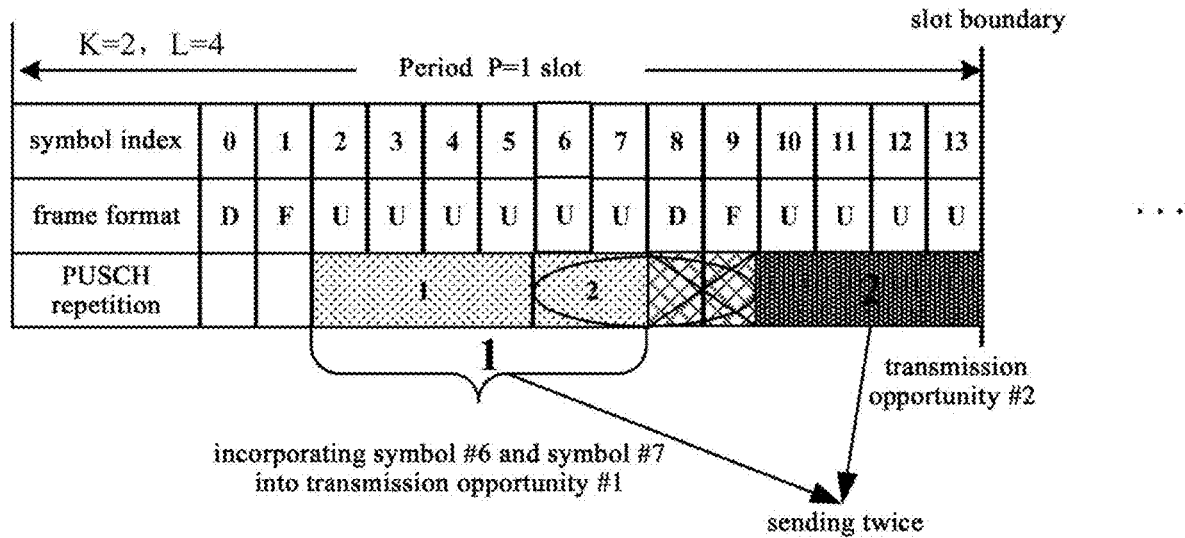
FIG. 9 is a schematic diagram illustrating transmission of a TB according to an embodiment of the present disclosure.

Mode 2: the terminal incorporates a non-colliding symbol corresponding to the transmission opportunity into another consecutive transmission opportunity relative to the transmission opportunity in terms of the time domain. As shown in FIG. 9, the symbol #6 and the symbol #7 are incorporated into the transmission opportunity #1, thereby forming a new transmission opportunity #1. Furthermore, "non-colliding" means that the time domain symbol of the transmission opportunity is an uplink symbol.

Mode 3: FIG. 9 is a schematic diagram illustrating transmission of a TB according to an embodiment of the present disclosure. As shown in FIG. 9, the terminal incorporates the non-colliding symbols corresponding to the transmission opportunity #2 into the consecutive transmission opportunity #1 in terms of time domain, and further postpones the transmission opportunity #2 to the symbol #10 to the symbol #13 for transmission, without crossing the period P.

Figure 10:
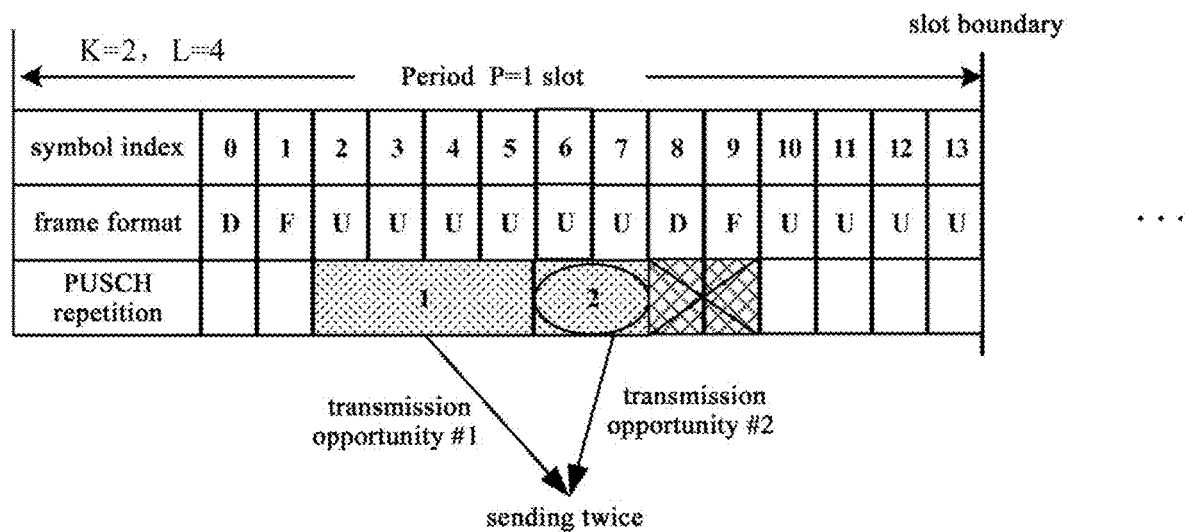
FIG. 10 is a schematic diagram illustrating transmission of a TB according to an embodiment of the present disclosure.

Mode 4: FIG. 10 is a schematic diagram illustrating transmission of a TB according to an embodiment of the present disclosure. As shown in FIG. 10, no information is sent on the colliding symbols, i.e., the symbol #8 and the symbol #9, corresponding to the transmission opportunity #2, and a PUSCH is sent only on the non-colliding symbols, i.e., the symbol #6 and the symbol #7, corresponding to the transmission opportunity #2.

Figure 11:
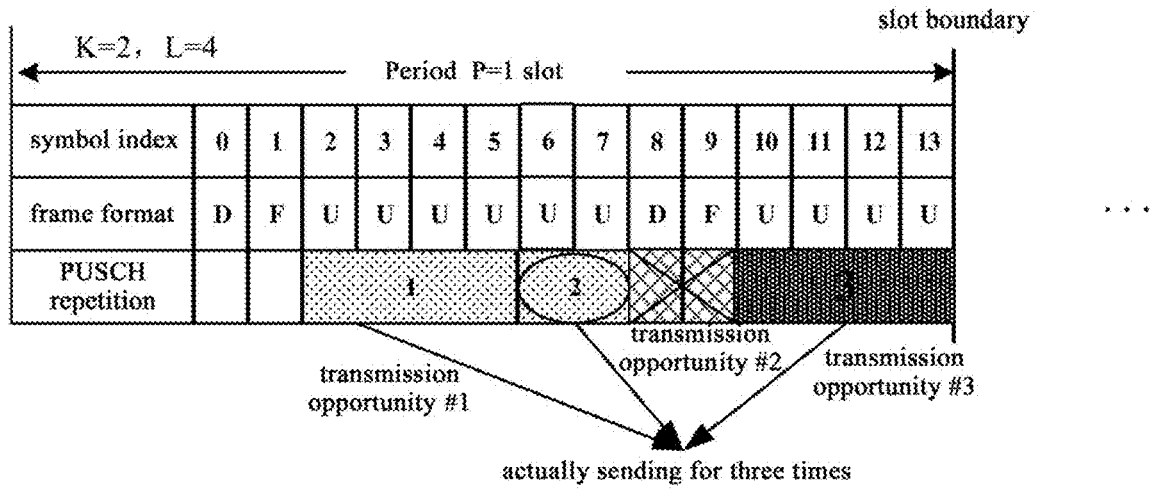
FIG. 11 is a schematic diagram illustrating transmission of a TB according to an embodiment of the present disclosure.

Mode 5: FIG. 11 is a schematic diagram illustrating transmission of a TB according to an embodiment of the present disclosure. As shown in FIG. 11, no information is sent on the colliding symbols, i.e., the symbol #8 and the symbol #9, corresponding to the transmission opportunity #2, and a PUSCH is repeatedly sent only on the non-colliding symbols, i.e., the symbol #6 and the symbol #7, corresponding to the transmission opportunity #2. Moreover, the terminal postpones the transmission opportunity #2 to the symbol #10 to the symbol #13 for transmission, without crossing the period P.

Mode 6: the terminal selects a set of resources in which no collision with a subframe format exists, and transmits the TB using the selected set of resources.

Mode 7: when an alignment time of a set of resources in which no collision with a subframe format exists is less than or equal to a threshold A in comparison with the threshold A, the terminal selects such set of resources to send the TB.

The alignment time refers to a time interval between a starting position of a time domain symbol where a first transmission opportunity is located in the set of resources and a moment when a service arrives.

When an alignment time of a set of resources in which no collision with a subframe format exists is greater than the threshold A in comparison with the threshold A, the terminal selects a set of resources according to a minimum delay principle to send a PUSCH, and the alignment time refers to a time interval between a starting position of a time domain symbol where a first transmission opportunity is located in the set of resources and a moment when a service arrives. In some implementations, the behavior of sending the TB using the set of resources by the terminal may be in any one of Modes 1 to 5. The minimum delay principle refers to that a time interval between a starting position of a time domain symbol where a first transmission opportunity is located in the selected set of resources and the moment when the service arrives is the minimum relative to time intervals between the starting positions of time domain symbols where first transmission opportunities are located in the other sets of resources and the moment when the service arrives.

Figure 12:
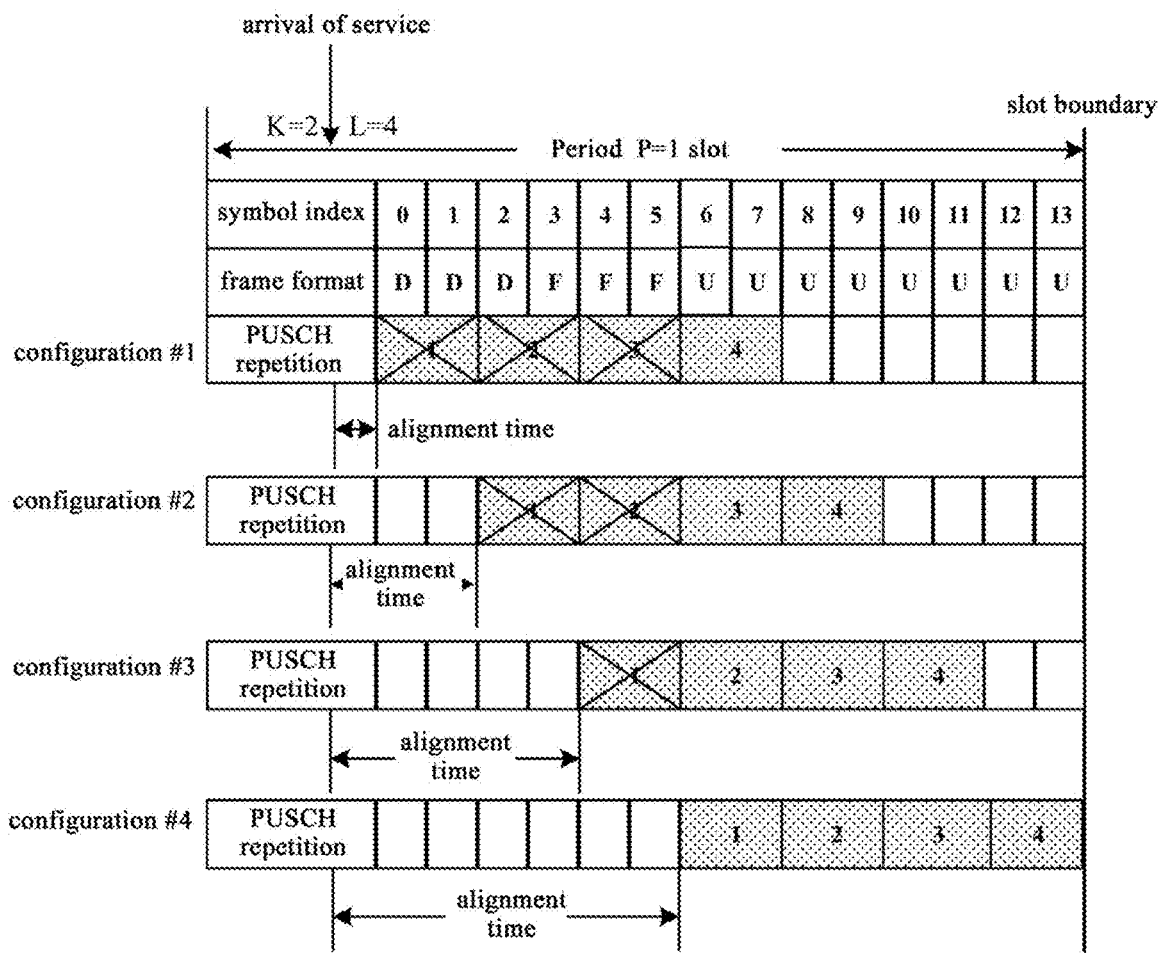
FIG. 12 is a schematic diagram illustrating transmission of a TB according to an embodiment of the present disclosure.

FIG. 12 is a schematic diagram illustrating transmission of a TB according to an embodiment of the present disclosure. As shown in FIG. 12, only configuration #4 among four sets of configurations does not have collision with a subframe format, so the alignment time of the configuration #4 is compared with the threshold A, and the TB is sent using the configuration #4 if the alignment time of the configuration #4 is less than the threshold A. But if the alignment time of the configuration #4 is greater than the threshold A, the configuration #1 with the shortest alignment time is selected to send the TB.

Mode 8: the terminal selects a resource in which the number of symbols colliding with a subframe format is the least to send the TB, such as the configuration #4 in FIG. 12. When two or more resource configurations have the same number of symbols colliding with a subframe format, the terminal select a set of resource configuration according a minimum alignment time principle to send the TB.

EXAMPLE FIVE

A same TB is provided with Q transmission opportunities in R consecutive slots, and the time domain resource information of the Q transmission opportunities may be obtained in any one of the following ways, with Q being an integer greater than or equal to 1 and R being an integer satisfying $0 < R \leq Q$.

Way 1:

A TB is sent by Y times of repeated transmission, and the time domain resource information of the Y times of repeated transmission includes at least one of the following information combinations:

Information Combination I: a starting symbol (Si) of an $i^{th}$ transmission opportunity, a time domain duration (Li) of the $i^{th}$ transmission opportunity and a slot index of a slot where the $i^{th}$ transmission opportunity is located, or, the starting symbol (Si) of the $i^{th}$ transmission opportunity, the time domain duration (Li) of the $i^{th}$ transmission opportunity and a slot index of a second transmission opportunity;

Information Combination II: a start and length indicator SLIVi of the $i^{th}$ transmission opportunity and the slot index of the slot where the $i^{th}$ transmission opportunity is located, or, the start and length indicator SLIVi of the $i^{th}$ transmission opportunity and the slot index of the second transmission opportunity.

The time-domain starting symbol (Si) and the time domain duration (Li) of the $i^{th}$ transmission opportunity may be obtained according to the SLIV, with i being an integer and $0 < i \leq Q$.

The time domain resource information is configured by an upper layer.

In some implementations, the time domain resource information is jointly indicated through configuration by the upper layer and control signaling from the upper layer. Or, the time domain resource information may be jointly indicated through the configuration by the upper layer and dynamic control signaling.

In some implementations, the slot index of the first transmission opportunity is determined by a slot offset (slot offset $K_2$), which refers to a duration from a downlink transmission of DCI to an uplink transmission of PUSCH The time domain resource allocation configured by the upper layer is shown in Table 1, and it should be noted that parameters of the time domain resource allocation configured by the upper layer may further include other control fields which are not described in detail here. As shown in Table 1, slot index 1 refers to the slot index of the first transmission opportunity, which is obtained according to the slot offset $K_2$, that is, the duration from the downlink transmission of DCI to the uplink transmission of PUSCH.

TABLE 1

| Row index | S1 | L1 | Slot index 1 | S2 | L2 | Slot index 2 |
|---|---|---|---|---|---|---|
| 1 | 2 | 12 | 0 | 3 | 10 | 2 |
| 2 | 8 | 1 | 1 | 1 | 12 | 3 |
| ... | ... | ... | ... | ... | ... | ... |

In some implementations, a value of slot index i may be a specific slot index of a slot where the $i^{th}$ transmission opportunity is located; as shown in Table 1, when row index=1, slot index 1=0, which indicates that the slot index of the first transmission opportunity is a slot #0, and slot index 2=2, which indicates that the slot index of the second transmission opportunity is a slot #2.

In some implementations, the value of slot index i may also be a slot offset relative to the slot index of the slot where the first transmission opportunity is located. As shown in Table 1, when row index=2, the slot index of the first transmission opportunity is a slot #1, and the value of slot index 2 is 2, which indicates that the slot index of the second transmission opportunity is 1+2=3, that is, a slot #3.

In some implementations, the value of slot index i may also be a slot offset relative to a slot index (i−1) of a previous transmission opportunity. For example, the slot index of the second transmission opportunity is the slot #1, if a value of slot index 3 is 0, it is indicated that a slot index of the third transmission opportunity is 1+0=1, i.e., the slot #1, that is, the second and third transmission opportunities are in the same slot.

Way 2:

A TB is sent by Y times of repeated transmission, and the time domain resource information of the Y times of repeated transmission includes at least one of the following information combinations:

Information Combination III: the starting symbol (Si) of the $i^{th}$ transmission opportunity, the time domain duration (Li) of the $i^{th}$ transmission opportunity and a cross-slot indicator; and Information Combination IV: the start and length indicator SLIVi of the $i^{th}$ transmission opportunity and the cross-slot indicator.

The time-domain starting symbol (Si) and the time domain duration (Li) of the $i^{th}$ transmission opportunity can be obtained according to the SLIV.

The cross-slot indicator is related to the number of times of repeated transmission/the number of transmission opportunities.

The time domain resource information is configured by an upper layer.

In some implementations, the time domain resource information is jointly indicated through configuration by the upper layer and control signaling from the upper layer, or, the time domain resource information may be jointly indicated through the configuration by the upper layer and dynamic control signaling.

The cross-slot indicator represents the information of a slot where a time domain resource SLIV of a current transmission opportunity is located. In some implementations, a field of cross-slot indicator includes a bitmap indicator formed by multiple bits; and when the bits in the field are flipped, it is indicated that a slot index of the slot where the time domain resource SLIV of the current transmission opportunity is located is changed from a slot index of a slot where a time domain resource SLIV of a previous transmission opportunity is located. In some implementations, the first bit in the cross-slot indicator represents the slot index information of the second transmission opportunity, because the slot information of the first transmission opportunity is determined according to the slot offset (slot offset $K_2$), which refers to the duration from the downlink transmission of DCI to the uplink transmission of PUSCH.

As shown in Table 2, when entry=1, a value of the cross-slot indicator is 110, which indicates that the first and second transmission opportunities are not in one slot, and the third and fourth transmission opportunities are not in one slot. For example, a time domain symbol of the first transmission opportunity is in slot #1, a time domain symbol of the second transmission opportunity is in slot #2, a time domain symbol of the third transmission opportunity is in slot #2, and a time domain symbol of the fourth transmission opportunity is in slot #3. The slot index 1 refers to the slot index of the first transmission opportunity and is obtained according to the slot offset $K_2$.

It is also possible that the bit flipping refers to crossing a slot boundary. For example, it is predefined that 0 indicates the transmission opportunities are in a same slot, and 1 indicates that the bits are flipped, which means that the transmission opportunities cross over a slot boundary.

As shown in Table 2, when entry=1, the value of the cross-slot indicator is 110, which indicates that the first and second transmission opportunities are not in one slot, and the third and fourth transmission opportunities are not in one slot. For example, a time domain resource of the first transmission opportunity is in slot #1, a time domain resource of the second transmission opportunity is in slot #2, a time domain resource of the third transmission opportunity is in slot #3, and a time domain resource of the fourth transmission opportunity is in slot #3.

TABLE 2

| Entry | PUSCH mapping type | 1st SLIV | Slot index 1 ($K_2$) | 2nd SLIV | 3rd SLIV | 4th SLIV | Cross-slot indicator |
|---|---|---|---|---|---|---|---|
| 0 | Type B | Value A1 | 0 | Value A2 | | | 1 |
| 1 | Type B | Value B1 | 1 | Value B2 | Value B3 | Value B4 | 110 |
| 2 | Type B | Value C1 | 0 | Value C2 | | | 0 |
| ... | ... | ... | ... | ... | ... | ... | ... |

Way 3:

A TB is sent by Y times of repeated transmission, and the time domain resource information of the Y times of repeated transmission includes at least one of the following information combinations:

Information Combination V: the starting symbol (Si) of the $i^{th}$ transmission opportunity and the time domain duration (Li) of the $i^{th}$ transmission opportunity; and Information Combination VI: the start and length indicator SLIVi of the $i^{th}$ transmission opportunity.

The time-domain starting symbol (Si) and the time domain duration (Li) of the $i^{th}$ transmission opportunity can be obtained according to the SLIV.

The time domain resource information is configured by an upper layer.

In some implementations, the time domain resource information is jointly indicated through configuration by the upper layer and control signaling from the upper layer, or, the time domain resource information may be jointly indicated through the configuration by the upper layer and dynamic control signaling.

The time domain resource information of the $i^{th}$ transmission opportunity implicitly indicates whether the transmission opportunities crosses over a slot boundary. In some implementations, it is determined whether the time domain symbols corresponding to the $i^{th}$ transmission opportunity and one or more previous transmission opportunities overlap; and if the overlapping exists, it is indicated that the transmission opportunities crosses over the slot boundary, otherwise, it is indicated that the transmission opportunities do not cross over the slot boundary For example, if SLIV1 of the first transmission opportunity indicates that the starting symbol is a symbol #0 and the time domain duration is 8, that, the time domain positions are from the symbol #0 to a symbol #8, and SLIV2 of the second transmission opportunity indicates that the starting symbol is a symbol #9 and the time domain duration is 4, that is, the time domain positions are from the symbol #9 to the symbol #13, the two transmission opportunities are located in the same slot, because the two transmission opportunities do not overlap and a total time domain length of the two transmission opportunities does not exceed a total length of one slot.

If SLIV2 of the second transmission opportunity indicates that the starting symbol is a symbol #4 and the time domain duration is 6, that is, the time domain positions are from the symbol #4 to the symbol #10, the time domain positions of the first and second transmission opportunities overlap, which indicates that the two transmission opportunities cross over a slot boundary and are located in different slots.

In some implementations, the slot index of the first transmission opportunity is determined by a slot offset, which refers to a duration from a downlink transmission of DCI to an uplink preparation of PUSCH.

Way 4:

One parameter is introduced in any one of Ways 1 to 3. That is, one column is added to any one of Tables 1 and 2 to indicate switching of transmission schemes. For example, when the parameter is enabled or equal to 1, a PUSCH is sent according to Transmission Scheme 1 and only the first set of SLIVs are valid; and when the parameter is disabled or equal to 0, the PUSCH is sent according to Transmission Scheme 2 and a plurality of sets of SLIVs are valid, and vice versa.

Figures 13, 14, 15:
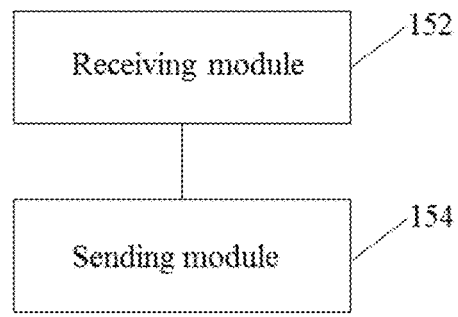
FIG. 13 is a schematic diagram illustrating transmission of a TB according to an embodiment of the present disclosure.
FIG. 14 is a schematic diagram illustrating transmission of a TB according to an embodiment of the present disclosure.
FIG. 15 is a block diagram of an information sending apparatus according to an embodiment of the present disclosure.

Transmission Scheme 1: one uplink grant schedules multiple times of PUSCH repeated transmission, and the one or multiple times of PUSCH repeated transmission may be performed in one slot, or in a segment of resource capable of transmitting uplink information in a same slot, or in multiple consecutive available slots. The Transmission Scheme 1 is called mini-slot PUSCH repetitions. The uplink grant is obtained by any one of the following means: RRC signaling and DCI. In some implementations, the segment of resource capable of transmitting uplink information in a same slot meets the condition that more than one DL/UL switch point exists in the slot. As shown in FIG. 13, a first segment of time domain resource capable of transmitting uplink information in the slot is from a symbol #2 to a symbol #7, and a second segment of time domain resource capable of transmitting uplink information in the slot is from a symbol #10 to a symbol #13.

Transmission scheme 2: one uplink grant schedules multiple times of PUSCH repeated transmission, a segment of resource capable of transmitting uplink information in a same slot allows only one time of PUSCH transmission, and the multiple times of PUSCH transmission can be carried out in multiple consecutive available slots. The Transmission Scheme 2 is called multi-segment PUSCH. The uplink grant is obtained by any one of the following means: RRC signaling and DCI. In some implementations, the segment of resource capable of transmitting uplink information in a same slot meets the condition that more than one DL/UL switch point exists in the slot. As shown in FIG. 13, the first segment of time domain resource capable of transmitting uplink information in the slot is from the symbol #2 to the symbol #7, and the second segment of time domain resource capable of transmitting uplink information in the slot is from the symbol #10 to the symbol #13.

In any one of Ways 1 to 4, during scheduling-free PUSCH repeated transmission, when a transmission opportunity collides with a subframe format, the colliding symbol is skipped and the available symbols corresponding to the transmission opportunity are divided into a plurality of consecutive repetitions to perform PUSCH transmissions. FIG. 13 is a schematic diagram illustrating transmission of a TB according to an embodiment of the present disclosure. As shown in FIG. 13, the time domain indicator SLIV of the second transmission opportunity starts from a symbol #8 and L=6, but the symbol #8 and symbol #9 collide with subframe formats, and thus the symbol #8 and the symbol #9 are skipped, the transmission at the second transmission opportunity starts from the symbol #10, the second transmission opportunity is divided into an actual transmission opportunity #2 and an actual transmission opportunity #3 across a slot boundary, and a total length of the actual transmission opportunity #2 and the actual transmission opportunity #3 is six symbols.

EXAMPLE SIX

One uplink grant schedules multiple times of PUSCH repeated transmission, and the one or multiple times of PUSCH repeated transmission may be performed in one slot, or in a segment of resource capable of transmitting uplink information in a same slot, or in multiple consecutive available slots.

FIG. 14 is a schematic diagram illustrating transmission of a TB according to an embodiment of the present disclosure. As shown in FIG. 14, when the uplink grant scheduling is notified by RRC or activated DCI, that is, during a process of scheduling-free transmission, only one set of time domain/frequency domain resources is configured for the TB, and multiple repetitions do not cross a period P, and the same period P corresponds to one Hybrid Automatic Repeat reQuest (HARM) ID. A PUSCH can be sent from any position among available time domain symbols in the period P. In some implementations, DMRS indexes of the first transmission opportunity and the remaining transmission opportunities are different. That is, a PUSCH carried at the first transmission opportunity uses DMRS i, and a PUSCH carried at the remaining transmission opportunities uses DMRS j.

Through the above description of the embodiment, those of ordinary skill in the art can understand clearly that the method according to the above embodiment may be implemented by software together with a necessary general-purpose hardware platform, and may also be implemented by hardware, but the former is preferable in most cases. Based on such understanding, the essence of the technical solutions of the present disclosure or a part of the technical solutions of the present disclosure contributing to the related art can be embodied in a form of a software product, which is stored in a storage medium (such as a Read-Only Memory (ROM)/Random Access Memory (RAM), a magnetic disk and an optical disc) and includes several instructions to enable a terminal device (which may be a mobile phone, a computer, a server or a network device) to execute the method described in the embodiment of the present disclosure.

An embodiment of the present disclosure further provides an information sending apparatus configured to implement the above embodiment and implementations, and what is illustrated above is not repeated here. The term "module" used below refers to software, hardware, or a combination of software and hardware that can perform predetermined functions. Although the apparatus described in the following embodiment may be preferably implemented by software, the implementations of apparatus by hardware or a combination of software and hardware are possible and can be conceived.

FIG. 15 is a block diagram of an information sending apparatus according to an embodiment of the present disclosure. As shown in FIG. 15, the apparatus includes:

a receiving module 152 configured to receive configuration information configured to indicate that a same TB is provided with Q transmission opportunities in R consecutive slots, with Q being an integer greater than or equal to 1, R being an integer and 0<R≤Q; and a sending module 154 configured to send the TB according to the configuration information.

In some implementations, the configuration information includes at least one of:

no information is sent at a transmission opportunity #t; and demodulation reference information (i.e., a demodulation reference signal (DMRS)) is sent at the transmission opportunity #t;

in a same slot, the transmission opportunity #t and a time domain resource of a consecutive transmission opportunity relative to the transmission opportunity #t in terms of time domain are combined into a new transmission opportunity;

in a same slot, in response to that a position of time domain resource of the transmission opportunity #t and positions of time domain resources of other transmission opportunities are not consecutive in terms of time domain, no DMRS or information is sent at the transmission opportunity #t;

where t is a transmission opportunity index and is an integer, and 0<t≤Q.

In some implementations, the configuration information further includes:

in response to that frequency hopping across different transmission opportunities is enabled, no frequency hopping is carried out at the transmission opportunity #t.

In some implementations, the configuration information further includes:

the transmission opportunity #t is determined in one of following ways:

in response to that a time domain resource of a transmission opportunity is less than a predefined value N, the transmission opportunity is the transmission opportunity #t; and N is an integer greater than or equal to 1;

in response to that a time domain resource of a transmission opportunity is less than M=f(L), the transmission opportunity is the transmission opportunity #t, and L is a time domain resource length of one of nominal transmission opportunities, or a time domain resource length of a first actual transmission opportunity, or a total time domain resource length of all actual transmission opportunities, or a shortest time domain resource length among those of the actual transmission opportunities, or a time domain resource length of a nominal or actual transmission opportunity corresponding to any one of RV={0,1,2,3}, or a longest time domain resource length among those of the actual transmission opportunities; and in response to that a target bitrate of a transmission opportunity is greater than a predefined target bitrate, the transmission opportunity is the transmission opportunity #t.

In some implementations, the configuration information includes:

an indication of time domain resource information of the Q transmission opportunities; and an indication of a transmission scheme of the Q transmission opportunities.

In some implementations, the time domain resource information includes at least one of the following information combinations:

Information Combination I: a starting symbol $S_i$ of an $i^{th}$ transmission opportunity, a time domain duration $L_i$ of the $i^{th}$ transmission opportunity and a slot index of a slot where the $i^{th}$ transmission opportunity is located; or, the starting symbol $S_i$ of the $i^{th}$ transmission opportunity, the time domain duration $L_i$ of the $i^{th}$ transmission opportunity and a slot index of a second transmission opportunity;

Information Combination II: a start and length indicator $SLIV_i$ of the $i^{th}$ transmission opportunity and the slot index of the slot where the $i^{th}$ transmission opportunity is located; or, the start and length indicator $SLIV_i$ of the $i^{th}$ transmission opportunity and the slot index of the second transmission opportunity;

Information Combination III: the starting symbol $S_i$ of the $i^{th}$ transmission opportunity, the time domain duration $L_i$ of the $i^{th}$ transmission opportunity and a cross-slot indicator which is related to the number of transmission opportunities;

Information Combination IV: the start and length indicator $SLIV_i$ of the $i^{th}$ transmission opportunity and the cross-slot indicator related to the number of transmission opportunities or repetitions;

Information Combination V: the starting symbol $S_i$ of the $i^{th}$ transmission opportunity and the time domain duration $L_i$ of the $i^{th}$ transmission opportunity;

Information Combination VI: the start and length indicator $SLIV_i$ of the $i^{th}$ transmission opportunity;

where i is an integer and 0<i≤Q.

In some implementations, the $SLIV_i$ is configured for obtaining the time-domain starting symbol $S_i$ and the time domain duration $L_i$ of the $i^{th}$ transmission opportunity.

In some implementations, the time domain resource information is configured by an upper layer.

In some implementations, the time domain resource information is jointly indicated through configuration by the upper layer and RRC signaling; or the time domain resource information is jointly indicated through configuration by the upper layer and DCI signaling.

In some implementations, the slot index of the first transmission opportunity is determined by a slot offset, which refers to a duration from a downlink transmission of DCI to an uplink transmission of PUSCH.

In some implementations, the cross-slot indicator is a bitmap indicator, and indicates whether a current transmission opportunity crosses over a slot boundary through bit flipping, and the first bit in the cross-slot indicator represents slot index information of the second transmission opportunity.

In some implementations, the transmission scheme includes one of:

Transmission Scheme 1: Q transmission opportunities are allocated in a same slot, or in a segment of uplink information transmission resource in a same slot, or in R consecutive slots;

Transmission Scheme 2: only one transmission opportunity is allocated in a segment of uplink information transmission resource in a same slot.

In some implementations, the receiving module 152 is further configured to:

acquire the configuration information through RRC signaling or DCI.

It should be noted that the above modules may be implemented by software or hardware. When by hardware, the modules may be implemented in the following ways: all the modules are located in a same processor, or the modules are randomly combined and located in different processors. However, the implementation of the modules by hardware is not limited to the above ways.

An embodiment of the present disclosure further provides a storage medium having a computer program stored therein, the computer program is configured to perform steps in the method above when being run.

In some implementations, the storage medium may be configured to store a computer program configured to perform the following steps:

S11, receiving configuration information configured to indicate that a same TB is provided with Q transmission opportunities in R consecutive slots, with Q being an integer greater than or equal to 1, R being an integer and 0<R≤Q; and S12, sending the TB according to the configuration information.

In some implementations, the above storage medium may include, but is not limited to, various medium capable of storing a computer program, such as a Universal Serial Bus Flash Disk (USB flash disk), an ROM, an RAM, a mobile hard disk, a magnetic disk and an optical disc.

An embodiment of the present disclosure further provides an electronic device including a memory having a computer program stored therein, and a processor configured to run the computer program to perform the steps in the method above.

In some implementations, the electronic device may further include a transmission device and an input/output device, which are all connected to the processor.

In some implementations, the processor may be configured to perform the following steps through a computer program:

S11, receiving configuration information configured to indicate that a same TB is provided with Q transmission opportunities in R consecutive slots, with Q being an integer greater than or equal to 1, R being an integer and 0<R≤Q; and S12, sending the TB according to the configuration information.

Reference may be made to the examples and the implementations described above for specific examples of this embodiment, which are not described here.

Apparently, it should be understood by those of ordinary skill in the art that all the modules or steps of the present disclosure described above may be implemented by a general-purpose computing device, may be integrated in a single computing device or distributed on a network composed of a plurality of computing devices. In some implementations, the modules or steps may be implemented by program codes executable by a computing device, such that the modules or steps can be stored in a storage device and executed by a computing device. In some cases, the steps illustrated or described may be performed in an order different from that described herein. The modules or steps may be separately made into integrated circuit modules, or some of the modules or steps may be made into a single integrated circuit module. Thus, the present disclosure is not limited to any specific combination of hardware and software.

The description above is merely of the exemplary embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the protection scope of the present disclosure.

What is claimed is:

1. An information sending method, comprises:
receiving configuration information configured to indicate that a same transport block is provided with Q transmission opportunities in R consecutive slots, wherein Q is an integer greater than or equal to 1, R is an integer and 0<R≤Q; and sending the transport block according to the configuration information, wherein the configuration information comprises at least one of:

the transport block is not sent at a transmission opportunity #t; and in the same slot, in response to that a position of time domain resource of the transmission opportunity #t and positions of time domain resources of other transmission opportunities are not consecutive in terms of time domain, no DMRS or information is sent at the transmission opportunity #t;

wherein t is a transmission opportunity index and is an integer, and 0<t≤Q, wherein the transmission opportunity #t is part of the Q transmission opportunities, wherein the transmission opportunity #t is determined in the one of following ways:

in response to that a time domain resource of one transmission opportunity of the Q transmission opportunities is less than a predefined value N, the one transmission opportunity is the transmission opportunity #t; wherein N is an integer greater than or equal to 1;

in response to that a time domain resource of the one transmission opportunity is less than M=f(L), the one transmission opportunity is the transmission opportunity #t, wherein L refers to any one of the following time domain resource lengths: a time domain resource length of one of nominal transmission opportunities, a time domain resource length of a first actual transmission opportunity, a total time domain resource length of all actual transmission opportunities, a shortest time domain resource length among those of the actual transmission opportunities, a time domain resource length of a nominal or actual transmission opportunity corresponding to any one of Redundancy Version RV={0,1,2,3}), and a longest time domain resource length among those of the actual transmission opportunities; and in response to that a target bitrate of the one transmission opportunity is greater than a predefined target bitrate, the one transmission opportunity is the transmission opportunity #t.

2. The method of claim 1, wherein the configuration information comprises:
in response to that frequency hopping across different transmission opportunities is enabled, no frequency hopping is carried out at the transmission opportunity #t.

3. The method of claim 2, wherein
a frequency domain position of the transmission opportunity #t is the same as a frequency domain position of a second hop of a previous transmission opportunity or as a frequency domain position of a first hop of a following transmission opportunity, wherein the previous transmission opportunity or the following transmission opportunity and the transmission opportunity #t being consecutive in terms of time domain.

4. The method of claim 1, wherein $$f(L) = \left\lfloor \frac{L}{X} \right\rfloor \text{ or } f(L) = \left\lceil \frac{L}{X} \right\rceil,$$

where L and X are integers greater than or equal to 1.

5. The method of claim 1, wherein
the predefined target bitrate is notified by Radio Resource Control (RRC) or Downlink Control Information (DCI), or acquired from target bitrates in a Modulation and Coding Scheme (MCS) index.

6. The method of claim 1, wherein the configuration information comprises:
an indication of time domain resource information of the Q transmission opportunities; and
an indication of a transmission scheme of the Q transmission opportunities.

7. The method of claim 6, wherein
the time domain resource information comprises at least one of the following information combinations:
Information Combination I: a starting symbol Si of an $i^{th}$ transmission opportunity, a time domain duration Li of the $i^{th}$ transmission opportunity and a slot index of a slot where the $i^{th}$ transmission opportunity is located;
or, the starting symbol Si of the $i^{th}$ transmission opportunity, the time domain duration Li of the $i^{th}$ transmission opportunity and a slot index of a second transmission opportunity;
Information Combination II: a start and length indicator SLIVi of the $i^{th}$ transmission opportunity and the slot index of the slot where the $i^{th}$ transmission opportunity is located;
or, the start and length indicator SLIVi of the $i^{th}$ transmission opportunity and the slot index of the second transmission opportunity;
Information Combination III: the starting symbol Si of the $i^{th}$ transmission opportunity, the time domain duration Li of the $i^{th}$ transmission opportunity and a cross-slot indicator which is related to the number of the Q transmission opportunities or the number of times of repeated transmission of the transport block;
Information Combination IV: the start and length indicator SLIVi of the $i^{th}$ transmission opportunity and the cross-slot indicator;
Information Combination V: the starting symbol Si of the $i^{th}$ transmission opportunity and the time domain duration Li of the $i^{th}$ transmission opportunity; and
Information Combination VI: the start and length indicator SLIVi of the $i^{th}$ transmission opportunity;
wherein i is an integer and $0<t \leq Q$.

8. The method of claim 7, wherein
the SLIVi is configured for obtaining the time-domain starting symbol Si and the time domain duration Li of the $i^{th}$ transmission opportunity.

9. The method of claim 7, wherein
the time domain resource information is configured by an upper layer.

10. The method of claim 9, wherein
the time domain resource information is jointly indicated through configuration by the upper layer and RRC signaling; or
the time domain resource information is jointly indicated through configuration by the upper layer and DCI signaling.

11. The method of claim 7, wherein
the slot index of a first transmission opportunity of the ith transmission opportunity is determined by a slot offset, which refers to a duration from a downlink transmission of DCI to an uplink transmission of Physical Uplink Shared Channel (PUSCH).

12. The method of claim 7, wherein
the cross-slot indicator is a bitmap indicator, and indicates whether a current transmission opportunity crosses over a slot boundary through bit flipping, and the first bit in the cross-slot indicator represents slot index information of the second transmission opportunity.

13. The method of claim 6, wherein the transmission scheme comprises one of:
Transmission Scheme 1: the Q transmission opportunities are allocated in a same slot, or in a segment of uplink information transmission resource in a same slot, or in the R consecutive slots;
Transmission Scheme 2: only one transmission opportunity is allocated in a segment of uplink information transmission resource in a same slot.

14. The method of claim 1, wherein the receiving configuration information is configured to indicate that the same transport block is provided with the Q transmission opportunities in the R consecutive slots comprises:
acquiring the configuration information through RRC signaling or DCI.

15. A non-transitory storage medium having a computer program stored therein, wherein the computer program is configured to perform the method of claim 1 when being run by a processor.

16. An electronic device, comprising a memory having a computer program stored therein, and a processor configured to run the computer program to perform the method of claim 1.

17. An information transmitting apparatus, comprising:
a receiving module configured to receive configuration information configured to indicate that a same transport block is provided with Q transmission opportunities in R consecutive slots, wherein Q is an integer greater than or equal to 1, R is an integer and $0<t \leq Q$; and
a sending module configured to send the transport block according to the configuration information,
wherein the configuration information comprises at least one of:
the transport block is not sent at a transmission opportunity #t; and
in the same slot, in response to that a position of time domain resource of the transmission opportunity #t and positions of time domain resources of other transmission opportunities are not consecutive in terms of time domain, no DMRS or information is sent at the transmission opportunity #t;
wherein t is a transmission opportunity index and is an integer, and $0<t \leq Q$, wherein the transmission opportunity #t is part of the Q transmission opportunities, wherein the transmission opportunity #t is determined in the one of following ways:
in response to that a time domain resource of one transmission opportunity of the Q transmission opportunities is less than a predefined value N, the one transmission opportunity is the transmission opportunity #t; wherein N is an integer greater than or equal to 1;
in response to that a time domain resource of the one transmission opportunity is less than M=f (L), the one transmission opportunity is the transmission opportunity #t, wherein L refers to any one of the following time domain resource lengths: a time domain resource length of one of nominal transmission opportunities, a time domain resource length of a first actual transmission opportunity, a total time domain resource length of all actual transmission opportunities, a shortest time domain resource length among those of the actual transmission opportunities, a time domain resource length of a nominal or actual transmission opportunity corresponding to any one of Redundancy Version RV={0,1,2,3}), and a longest time domain resource length among those of the actual transmission opportunities; and in response to that a target bitrate of the one transmission opportunity is greater than a predefined target bitrate, the one transmission opportunity is the transmission opportunity #t.

* * * * *

UNITED STATES PATENT AND TRADEMARK OFFICE
CERTIFICATE OF CORRECTION

PATENT NO. : 12,289,712 B2
APPLICATION NO. : 17/598376
DATED : April 29, 2025
INVENTOR(S) : Min Ren et al.

It is certified that error appears in the above-identified patent and that said Letters Patent is hereby corrected as shown below:

In the Claims

Column 20, Lines 39, the formula reading:
- RV={0,1,2,3}) -
Should read:
-- RV={0,1,2,3} --

Column 21, Line 44, the formula reading:
- 0<t≤Q -
Should read:
-- $0 < i \leq Q$ --

Column 22, Line 32, the formula reading:
- 0<t≤Q -
Should read:
-- $0 < R \leq Q$ --

Column 23, Line 1, the formula reading:
- RV={0,1,2,3}) -
Should read:
-- RV={0,1,2,3} --

Signed and Sealed this
Twelfth Day of August, 2025

Coke Morgan Stewart
*Acting Director of the United States Patent and Trademark Office*